US010268741B2

(12) United States Patent
Barsness et al.

(10) Patent No.: US 10,268,741 B2
(45) Date of Patent: Apr. 23, 2019

(54) MULTI-NODAL COMPRESSION TECHNIQUES FOR AN IN-MEMORY DATABASE

(75) Inventors: Eric Lawrence Barsness, Pine Island, MN (US); Amanda Peters, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 707 days.

(21) Appl. No.: 11/833,290

(22) Filed: Aug. 3, 2007

(65) Prior Publication Data

US 2009/0037512 A1 Feb. 5, 2009

(51) Int. Cl.
G06F 17/30 (2006.01)

(52) U.S. Cl.
CPC .............. G06F 17/30575 (2013.01)

(58) Field of Classification Search
CPC ................................. G06F 17/30575
See application file for complete search history.

(56) References Cited

U.S. PATENT DOCUMENTS

| | | | | |
|---|---|---|---|---|
| 5,692,192 | A * | 11/1997 | Sudo | 718/105 |
| 7,213,158 | B2 * | 5/2007 | Bantz et al. | 713/193 |
| 2004/0003272 | A1 * | 1/2004 | Bantz et al. | 713/193 |
| 2004/0064647 | A1 * | 4/2004 | DeWhitt et al. | 711/135 |
| 2004/0101271 | A1 * | 5/2004 | Boston et al. | 386/46 |
| 2005/0065910 | A1 * | 3/2005 | Welton et al. | 707/2 |
| 2007/0022055 | A1 * | 1/2007 | Eliason et al. | 705/51 |
| 2007/0087686 | A1 * | 4/2007 | Holm et al. | 455/3.06 |
| 2007/0094269 | A1 * | 4/2007 | Mikesell et al. | 707/10 |
| 2007/0255818 | A1 * | 11/2007 | Tanzer et al. | 709/224 |
| 2007/0287498 | A1 * | 12/2007 | Wang et al. | 455/556.1 |
| 2008/0201718 | A1 * | 8/2008 | Zohar | 718/105 |
| 2008/0232457 | A1 * | 9/2008 | Fallon et al. | 375/240 |
| 2009/0055932 | A1 * | 2/2009 | Kuroda | 726/26 |

* cited by examiner

Primary Examiner — Taelor Kim
(74) Attorney, Agent, or Firm — Patterson + Sheridan, LLP (57) ABSTRACT

Embodiments of the invention are described being used to distribute a database across a plurality of compute nodes of a parallel computing system. That is, a method is described for creating a fully in-memory database on the parallel computing system. Further, data compression techniques are described being used to increase the performance of the in-memory database by compressing some portions of the database to fit within a single node or a logically or physically related group of nodes.

23 Claims, 6 Drawing Sheets

MULTI-NODAL COMPRESSION TECHNIQUES FOR AN IN-MEMORY DATABASE

BACKGROUND OF THE INVENTION

Field of the Invention

Embodiments of the invention relate to database storage. More specifically, embodiments of the invention are directed to multi-nodal compression techniques for an in-memory database.

Description of the Related Art

Powerful computers may be designed as highly parallel systems where the processing activity of hundreds, if not thousands, of processors (CPUs) are coordinated to perform computing tasks. These systems are highly useful for a broad variety of applications including, financial modeling, hydrodynamics, quantum chemistry, astronomy, weather modeling and prediction, geological modeling, prime number factoring, image processing (e.g., computer-generated imagery animations, and renderings), to name but a few examples.

One family of parallel computing systems has been (and continues to be) developed by International Business Machines (IBM) under the name Blue Gene®. The Blue Gene®/L architecture provides a scalable, parallel computer that may be configured with a maximum of 65,536 (216) compute nodes. Each compute node includes a single application specific integrated circuit (ASIC) with 2 CPU's and memory. The Blue Gene®/L architecture has been successful and on Oct. 27, 2005, IBM announced that a Blue Gene®/L system had reached an operational speed of 280.6 teraflops (280.6 trillion floating-point operations per second), making it the fastest computer in the world at that time. Further, as of June 2005, Blue Gene®/L installations at various sites world-wide were among five out of the ten top most powerful computers in the world.

IBM is currently developing a successor to the Blue Gene®/L system, named Blue Gene®/P. Blue Gene®/P is expected to be the first computer system to operate at a sustained 1 petaflops (1 quadrillion floating-point operations per second). Like the Blue Gene®/L system, the Blue Gene®/P system is scalable allowing for configurations that include different numbers of racks.

In addition to the Blue Gene® architecture developed by IBM, other highly parallel computer systems have been (and are being) developed. For example, a Beowulf cluster may be built from a collection of commodity off-the-shelf personal computers. In a Beowulf cluster, individual systems are connected using local area network technology (e.g., Ethernet) and system software is used to execute programs written for parallel processing on the cluster of individual systems. Another approach to parallel computing includes large distributed or grid-type computing systems which pool the computing power of hardware spread over widely spread locations.

Often, a database may be too large to store in the memory of a single node of a parallel system. In such a case, the database needs to be mapped to multiple nodes of the parallel system. The amount of physical memory available limits how large a portion of an in-memory database may be stored on a given compute node. One approach to increasing this limit is to compress portions of data from the in-memory database on a given compute node, thereby increasing the total amount of data stored on that node. However, this approach incurs certain costs; namely, decompressing the data on a node takes time. At the same time, storing data on multiple nodes may also result in increased processing costs. For example, an application running on a parallel system may only require data access to a subset of data from the in-memory database. In such a case, having that data span many nodes may also affect performance, as crossing logical or physical boundaries present in the architecture of a particular parallel computing system may increase processing time due to overhead of input-output (I/O) and network communications, etc.

Accordingly, there remains a need in the art for multi nodal compression techniques for an in-memory database.

SUMMARY OF THE INVENTION

The present invention generally provides a method for optimizing the distribution of a database across a plurality of compute nodes on a parallel computing system. One embodiment of the invention provides a computer-implemented method for distributing a database having a plurality of datasets on a plurality of compute nodes on a parallel computing system. The method generally includes selecting a first dataset from the plurality of datasets and evaluating a profile associated with the first dataset to determine a compression level to use in compressing the first dataset. The method also includes compressing the first dataset using the determined compression level, and storing the compressed dataset on at least one of the plurality of compute nodes, and distributing the remaining datasets from the plurality of datasets on plurality of compute nodes of the parallel computing system, thereby creating an in-memory database.

Another embodiment of the invention includes a computer-readable storage medium containing a program which, when executed, performs an operation for distributing a database having a plurality of datasets on a plurality of compute nodes on a parallel computing system. The operation may generally include selecting a first dataset from the plurality of datasets and evaluating a profile associated with the first dataset to determine a compression level to use in compressing the first dataset. The method also includes compressing the first dataset using the determined compression level, storing the compressed dataset on at least one of the plurality of compute nodes, and distributing the remaining datasets from the plurality of datasets on plurality of compute nodes of the parallel computing system, thereby creating an in-memory database.

Yet another embodiment of the invention includes a parallel computing system having a plurality of compute nodes, each having at least a processor and a memory and a control node configured to perform an operation for distributing a database having a plurality of datasets on the plurality of compute nodes of the parallel computing system. The operation performed by the control node may generally include selecting a first dataset from the plurality of datasets, and evaluating a profile associated with the first dataset to determine a compression level to use in compressing the first dataset. The operation may also include compressing the first dataset using the determined compression level, storing the compressed dataset on at least one of the plurality of compute nodes, and distributing the remaining datasets from the plurality of datasets on plurality of compute nodes of the parallel computing system, thereby creating an in-memory database.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiment.

DETAILED DESCRIPTION OF THE PREFERRED EMBODIMENTS

Embodiments of the invention provide a method to distribute a database across compute nodes of a parallel computing system. That is, to a method for creating a fully in-memory database on the parallel computing system. Data compression techniques may be used increase the performance of the in-memory database by compressing some portions of the database to fit within a single node or a logically or physically related group of nodes. For example, consider a case where a single database file may be compressed to fit within the memory of a single node: accessing such a database file on the single node may provide superior performance to storing the database file on multiple nodes, even when the overhead required to decompress and access the database file is taken into account. This result occurs as the overhead required for network communications between nodes may take longer than the time that is required to decompress the file on the single compute node, access the decompressed data, evaluate a query, and return results. Similarly, compressing a portion of a database to fit on a group of nodes that all share a common I/O path or other resources may provide superior performance to distributing the data in a manner that breaks logical or physical boundaries of the parallel computing system.

In the following, reference is made to embodiments of the invention. However, it should be understood that the invention is not limited to specifically described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM or DVD-ROM disks readable by a CD- or DVD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
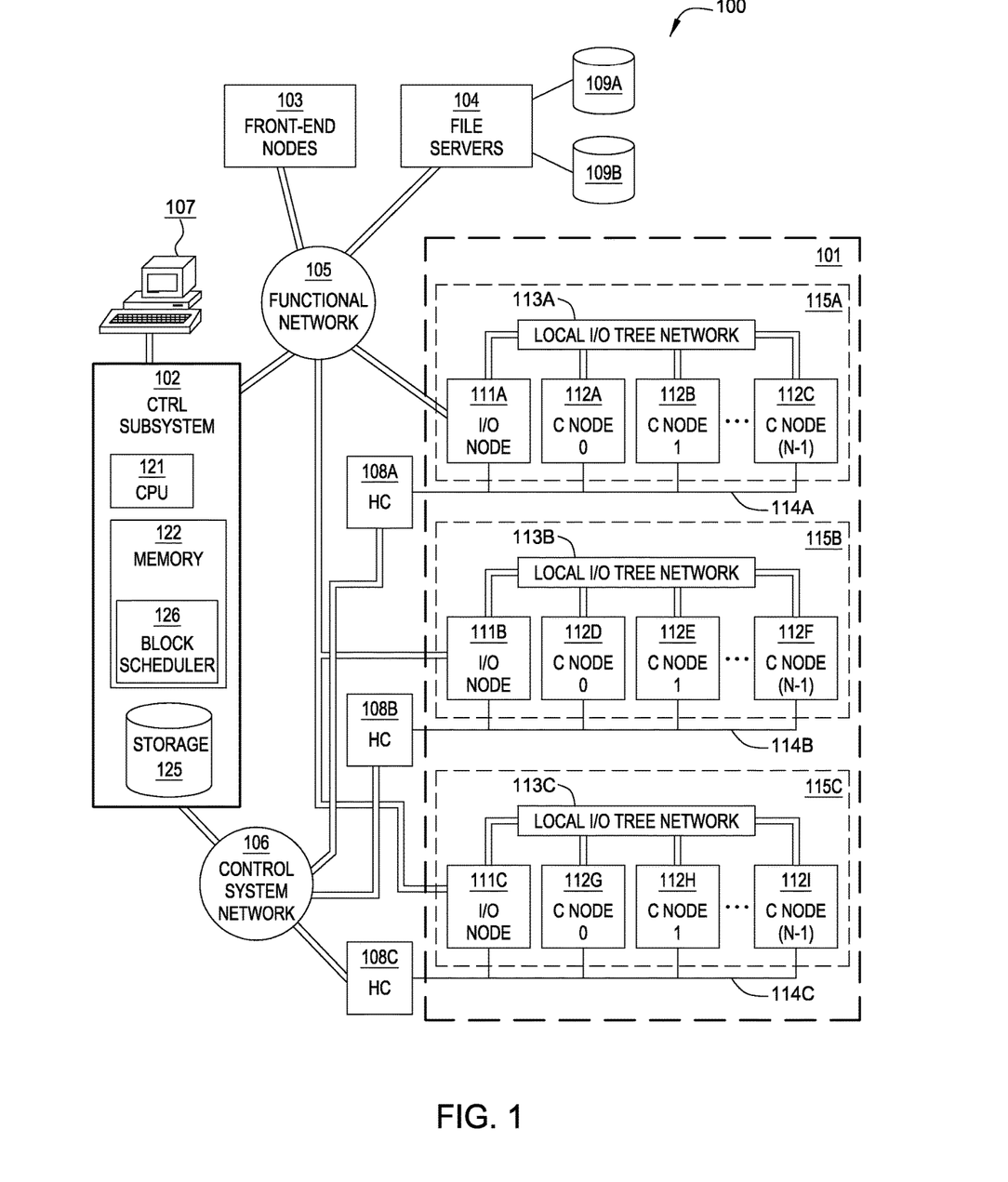
FIG. 1 is a diagram of components of a parallel computing system, according to one embodiment of the present invention.

FIG. 1 is a block diagram of components of parallel computing system 100, according to one embodiment of the present invention. Illustratively, computer system 100 illustrates the high-level architecture of an IBM Blue Gene® computer system, it being understood that other parallel computer systems may be used, and the description of a preferred embodiment herein is not intended to limit the present invention.

As shown, computer system 100 includes a compute core 101 having a number of compute nodes arranged in a regular array or matrix, which perform the useful work performed by system 100. The operation of computer system 100, including compute core 101, may be controlled by control subsystem 102. Various additional processors in front-end nodes 103 may perform auxiliary data processing functions, and file servers 104 provide an interface to data storage devices such as disk based storage 109A, 109B or other I/O (not shown). Functional network 105 provides the primary data communication path among compute core 101 and other system components. For example, data stored in storage devices attached to file servers 104 is loaded and stored to other system components through functional network 105.

Also as shown, compute core 101 includes I/O nodes 111A-C and compute nodes 112A-I. Compute nodes 112 provide the processing capacity of parallel system 100, and are configured to execute applications written for parallel processing. I/O nodes 111 handle I/O operations on behalf of compute nodes 112. Each I/O node 111 may include a processor and interface hardware that handles I/O operations for a set of N compute nodes 112, the I/O node and its respective set of N compute nodes are referred to as a Pset. Compute core 101 contains M Psets 115A-C, each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O tree network 113A-C. The I/O nodes, in turn, are connected to functional network 105, over which they communicate with I/O devices attached to file servers 104, or with other system components. Thus, the local I/O tree networks 113 may be viewed logically as extensions of functional network 105, and like functional network 105 are used for data I/O, although they are physically separated from functional network 105.

Control subsystem 102 directs the operation of the compute nodes 112 in compute core 101. Control subsystem 102 is a computer that includes a processor (or processors) 121, internal memory 122 local storage 125, and block scheduler 126. An attached console 107 may be used by a system administrator or similar person. Control subsystem 102 may also include an internal database which maintains state information for the compute nodes in core 101, and an application which may be configured to, among other things, control the allocation of hardware in compute core 101, direct the loading of data on compute nodes 112, and perform diagnostic and maintenance functions. Block scheduler 126 may be configured to assign compute nodes 112 of compute core 101 to a block used to carry out a given user request or job. The database on local storage 125 may be used to record which computing resources (e.g., compute nodes 112) of the parallel system are allocated to a given block and which computing resources are available to perform computing tasks.

In one embodiment, a request to perform a computing task may also specify a block size to use in carrying out the task. That is, the user may request the size of a block on which a submitted job should be executed. Further, in some cases the user may request specific compute nodes 112 of parallel system 100. This may be useful where different compute nodes have access to different resources. For example, in a distributed or grid-type system, computing resources available to one block of compute nodes may be dissimilar to others. Thus, if a job requires access to resources that are available at a particular location of a grid, then the job may request access to that location. Similarly, where multiple users may rent (or otherwise share) computing time on a parallel system (e.g., system 100), the size of a block may depend on which (or how many) compute nodes 112 a given user is authorized to access. Alternatively, a job may specify that a job should be run on a block of a particular size, without regard to any particular location on the parallel system. This may be useful when running jobs on a large cluster or parallel system such as a Blue Gene® system, where the compute nodes are relatively homogenous.

Control subsystem 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate.

In addition to control subsystem 102, front-end nodes 103 provide computer systems used to perform auxiliary functions which, for efficiency or otherwise, are best performed outside compute core 101. Functions which involve substantial I/O operations are generally performed in the front-end nodes. For example, interactive data input, application code editing, or other user interface functions are generally handled by front-end nodes 103, as is application code compilation. Front-end nodes 103 are connected to functional network 105 and may communicate with file servers 104.

Figure 2:
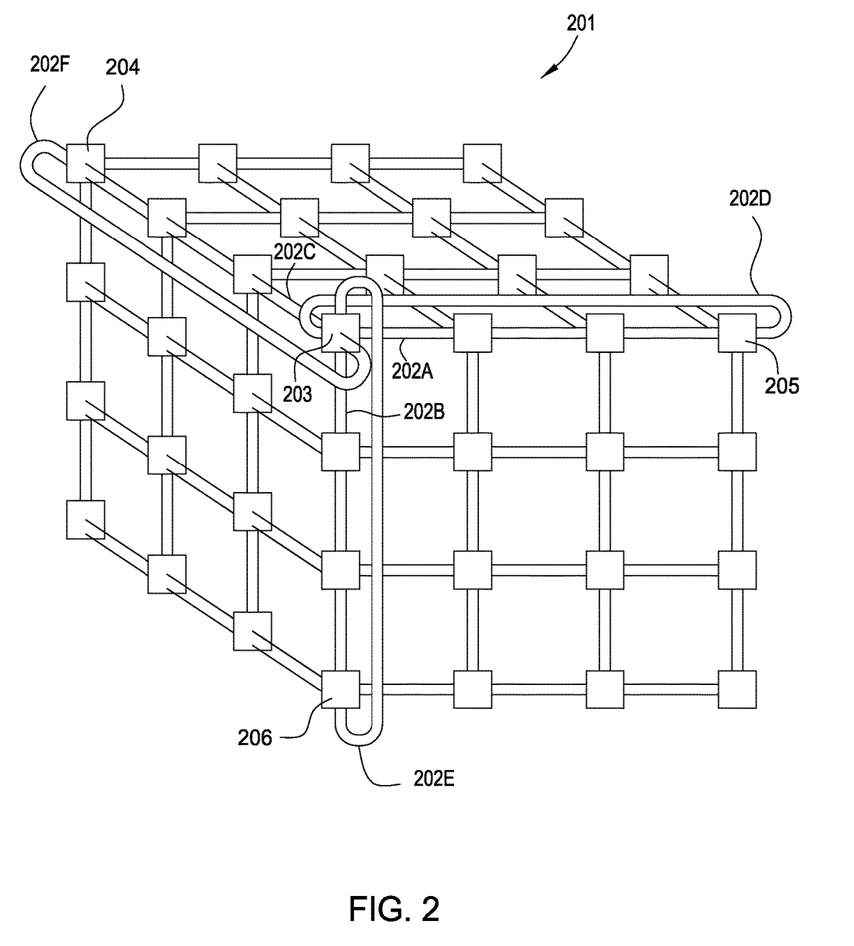
FIG. 2 is a conceptual illustration of a three-dimensional torus network of the system of FIG. 1, according to one embodiment of the invention.

In one embodiment, compute nodes 112 are arranged logically in a three-dimensional torus, where each compute node 112 may be identified using an x, y and z coordinate. FIG. 2 is a conceptual illustration of a three-dimensional torus network of system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 contiguous nodes, it will be understood that the actual number of compute nodes in a parallel computing system is typically much larger. For example, a complete Blue Gene®/L system may include as many as 65,536 compute nodes. Each compute node 112 in torus 201 includes a set of six node-to-node communication links 202A-F which allows each compute nodes in torus 201 to communicate with its six immediate neighbors, two nodes in each of the x, y and z coordinate dimensions. Torus 201 is also representative of a block formed from 64 contiguous compute nodes. That is, torus 201 may be a subset of compute nodes from compute core 101 used to form a block and to execute a particular computing task.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y, or z dimensions form a torus in that dimension because the point-to-point communication links logically wrap around. As shown, for example, links 202D, 202E, and 202F which wrap around from compute node 203 to other end of compute core 201 in each of the x, y and z dimensions. Thus, although node 203 appears to be at a "corner" of the torus, node-to-node links 202A-F link node 203 to nodes 204, 205, and 206, in the x, y, and Z dimensions of torus 201.

Figure 3:
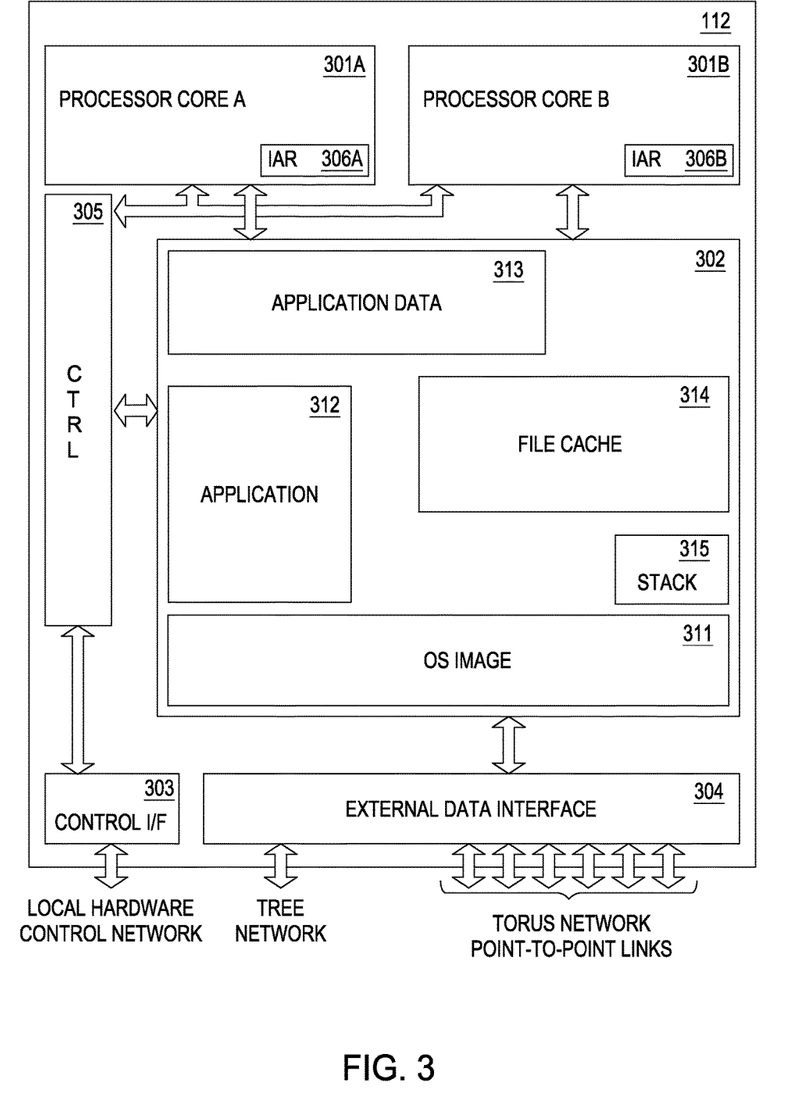
FIG. 3 is a diagram of a compute node of the system of FIG. 1, according to one embodiment of the invention.

FIG. 3 is a diagram of compute node 112 of the system 100 of FIG. 1, according to one embodiment of the invention. As shown, compute node 112 includes processor cores 301A and 301B, and also includes memory 302 used by both processor cores 301; an external control interface 303 which is coupled to local hardware control network 114; an external data communications interface 304 which is coupled to the corresponding local I/O tree network 113, and the corresponding six node-to-node links 202 of the torus network 201; and monitoring and control logic 305 which receives and responds to control commands received through external control interface 303. Monitoring and control logic 305 may access processor cores 301 and locations in memory 302 on behalf of control subsystem 102 to read (or in some cases alter) the operational state of node 112. In one embodiment, each node 112 may be physically implemented as a single, discrete integrated circuit chip.

As described, functional network 105 may service many I/O nodes, and each I/O node is shared by multiple compute nodes 112. Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311, an application code image 312, and user application data structures 313 as required. Operating system image 311 provides a copy of a simplified-function operating system running on compute node 112. Operating system image 311 may include a minimal set of functions required to support operation of the compute node 112. In a Blue Gene® system, for example, operating system image 311 contains a version of a Linux®-like operating system customized to run on compute node 112. Of course, other operating systems may be used, and further it is not necessary that all nodes employ the same operating system. (Linux® is a registered trademark of Linus Torvalds in the United States and other countries.)

Application code image 312 represents a copy of the application code being executed by compute node 112. Application code image 312 may include a copy of a computer program and data submitted for execution on system 100. In one embodiment, a group of compute nodes may be assigned to a block, where each node in the block executes the same application code image 312. The application image on each node may be configured to communicate with the other nodes of that block in performing the computing job. For example, many computing tasks may be performed in parallel, and each node of the block participates in performing a collective task. Using parallel processing techniques to run on a block of hundreds, thousands, or even tens of thousands of compute nodes allows otherwise intractable computing tasks to be performed. Memory 302 may also include a call-return stack 315 for storing the states of procedures which must be returned to, which is shown separate from application code image 302, although in may be considered part of application code state data.

As part of executing a job, application 312 may be configured to transmit messages from compute node 112 to other compute nodes assigned to a given block. For example, the high level Message Passing Interface (MPI) call of MPI_Send( ); may be used by application 312 to transmit a message from one compute node to another. On the other side of the communication, the receiving node may call use the MPI call MPI_Recieve( ); to receive and process the message. As described above, in a Blue Gene® system, the external data interface 304 may be configured to transmit the high level MPI message by encapsulating it within a set of packets and transmitting the packets of over the torus network of point-to-point links. Other parallel systems also include a mechanism for transmitting messages between different compute nodes. For example, nodes in a Beowulf cluster may communicate using a using a high-speed Ethernet style network. Similarly, large distributed or grid-type systems use message passing techniques to coordinate the processing activity of a block of compute nodes.

As stated, in one embodiment, the compute nodes of a parallel computing system may be used to store an in-memory database. Because parallel computing systems typically have a large number of compute nodes, a large in-memory database may be stored by a parallel computing system. Further, the processing speed of large parallel computing system, along with the data access times for an in-memory database, may provide a very efficient computing environment for accessing the in-memory database. However, prior to any database operations being performed, the parallel computing system needs to decide how to distribute the database across the nodes. That is, the system needs to determine a configuration for an in-memory database on the compute nodes of the parallel computing system.

In one embodiment, data compression techniques may be used to optimize the distribution of an in-memory database across the compute nodes of a parallel computing system. As is known, data compression is a technology that takes an input set of bytes and using a compression routine reduces the size of that input set of bytes without loss of information. When the data subsequently needs to be accessed, the compressed data is run through a corresponding decompression routine, restoring the input set of bytes. Additionally, many known compression techniques may be tuned to be "more" or "less" aggressive. Typically, the more aggressive the compression algorithm, the smaller the size of the compressed data and the more time required to decompress (and recompress) the input set. Thus, by tuning how aggressive the compression algorithm is performed, the compressed size of a portion of a database may be controlled.

By maximizing the amount of data on a given compute node, the system may reduce the number of nodes (and data communication between nodes) required to perform a given task or job submitted to the in-memory database. For example, once the database is mapped to nodes, jobs may submit queries executed over the in-memory database. A database management system (DBMS) may submit a query to some (or all) nodes of a parallel computing system that store an in-memory database. In turn, applications running on each compute node may execute the query for the portion of the in-memory database on that node.

However, as discussed above, computing resources are required to decompress data. Thus, the parallel computing system may determine how aggressively to compress a given portion of a database. In one embodiment, a DBMS monitoring application may be configured to determine, whether, and how aggressively, to compress portions of an in-memory database stored on the compute nodes of a parallel computing system. For example, this determination may depend on how frequently users access data from a given database file. In such a case, frequently accessed data may be distributed across nodes using lower (or no) compression and infrequently accessed data may be distributed with higher compression levels. In the simplest case, a database file (or other logical segment of a database) may be compressed so that the database file fits within a single compute node. This may be useful in cases where the uncompressed database file would otherwise be split across nodes such that access to that database file needs to wait for data communication processes between two (or more) compute nodes. Additionally, by compressing the database file to fit on a single node, the second node is free to perform other database functions, leveraging the architecture of a parallel computing system.

Extending this scenario, in other cases a given database file (or other given set of data) may be distributed across multiple compute nodes. For example, a database file may simply be too large, regardless of compression, to fit on a single compute node. Or if data from the database file is frequently accessed, high levels of compression may introduce too much overhead to provide a performance improvement. That is, for frequently accessed data, repeatedly compressing and recompressing the file may ultimately degrade overall database performance. In such cases, the impact of varying levels of compression may be evaluated by varying an amount of compute nodes to be allocated to store a given database file. In other words, using different number of nodes may allow the flexibility to use different levels of compression in determining a level of compression that improves the overall performance of an in-memory database. For example, database files that contain data that is infrequently queried or (or do not contain data with a high priority for rapid access) may be compressed at the most aggressive compression levels.

Additionally, when multiple nodes are considered, the logical or configuration of the nodes may also be taken into account. Consider a simple case where a database file is compressed to be stored on two compute nodes. Assume the nodes are configured to communicate over a torus network like the torus network of a Blue Gene system, described above, in such a case, distributing the compressed database file on two physically adjacent nodes may provide superior performance to distributing the file on two physically distant nodes. Further, the two adjacent nodes may be selected such that no physical or logical boundaries are crossed. For example, using the Blue Gene architecture discussed above, if a related portion of data may be compressed to fit on a single Pset, doing so may provide improved database performance over storing that portion of the database in a manner that crosses a Pset boundary. Of course, embodiments of the invention may be adapted for use with other parallel computing system architectures, with other forms of the logical and physical boundaries.

Figure 4A:
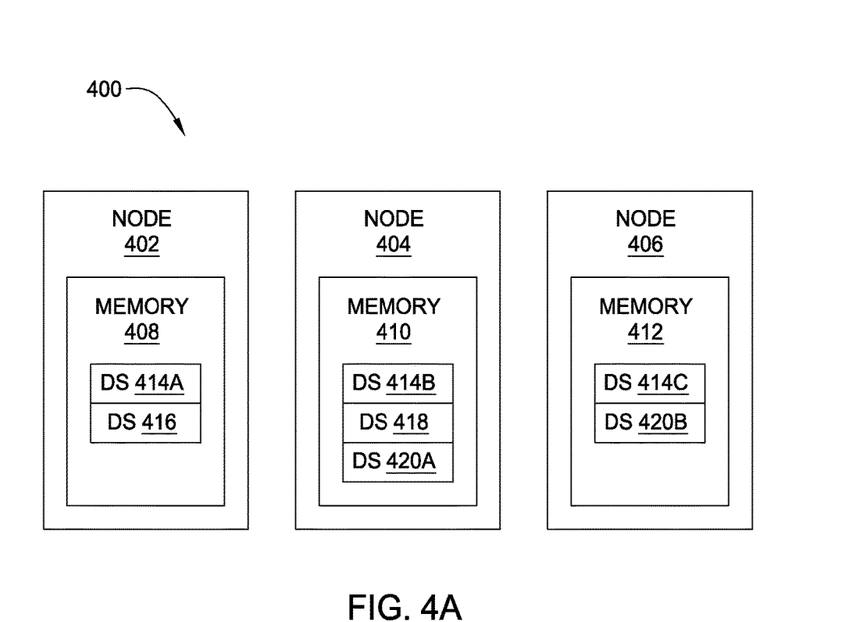
FIGS. 4A-4B are diagrams of an in-memory database distributed across multiple nodes of a parallel computing system, according to one embodiment of the invention.
Figure 4B:
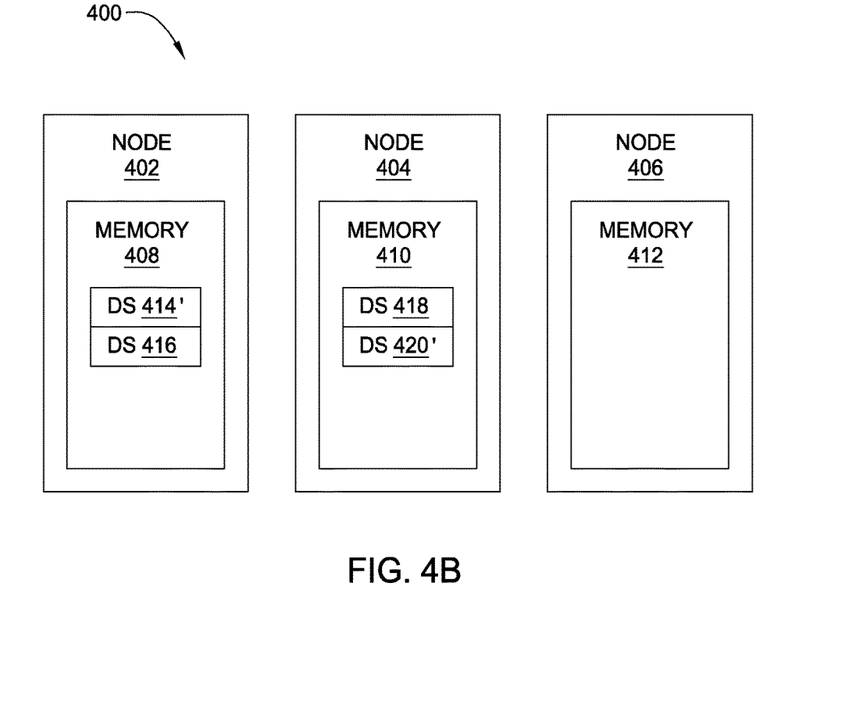

In one embodiment, data access times may provide another factor in determining compression levels for a given portion of a database. If the access time for a highly compressed database file on one node is greater than the access time for that same compressed database file on multiple nodes using lesser compression, then the lesser compression level may be used. More generally, any of these (or other) factors may be used to optimize the performance of an in-memory database by selectively compressing portions of the database to fit within physical or logical boundaries of a parallel computing system. Once the database is distributed across the compute nodes of a parallel computing system, applications running on individual compute nodes may decompress portions of the in-memory database while evaluating queries. Despite this additional overhead, if the compression allows a logical set of data to be stored on a single node (or logically or physically related group of nodes) the overall performance of the in-memory database may be improved FIGS. 4A-4B are diagrams of an in-memory database distributed across multiple nodes of a parallel computing system 400, according to one embodiment of the invention. As shown, FIG. 4A illustrates an in-memory database before portions of the in-memory database are compressed, and FIG. 4B illustrates the in-memory database after portions have been compressed.

Illustratively, parallel computing system 400 includes compute nodes 402, 404, and 406, each containing at least one processor (not shown), and memories 408, 410, and 412, respectively. Thus, compute nodes 402, 404 and 406 are representative of a Blue Gene® system as well as other parallel architectures. Collectively, memories 408, 410, and 412 store an in-memory database that includes four datasets (DS) 414, 416, 418, and 420. Each dataset represents a database file, table, or some other portion of a database or collection of data. As shown in FIG. 4A, dataset 414 is distributed across nodes 402, 404 and 406, dataset 416 is distributed on node 402, dataset 418 is distributed on node 404, and dataset 420 is distributed on nodes 404 and 406. Thus, a database operation (e.g., a query) that needs to access or evaluate data from dataset 414 requires the coordination of nodes 402, 404, and 406. Similarly, a database operation that needs to access or evaluate data from dataset 420 requires the coordination of nodes 404 and 406.

Collectively, datasets 414A, 414B, and 414C represent dataset 414, which, uncompressed, is too large to be stored in one of compute nodes 402, 404 or 406. Similarly, datasets 418A and 418B collectively represent a dataset 418, which, uncompressed, is too large to be stored in one of compute nodes 402, 404 or 406.

In contrast, FIG. 4B shows an in-memory database that includes four datasets 414', 416, 418, and 420', where datasets 414A, 414B, and 414C and 420A and 420B from FIG. 4A have been compressed, according to one embodiment of the invention. Illustratively, a compressed dataset 414' is now stored only on node 402 and a compressed dataset 420' is now stored only on compute node 404. Thus, a database operation that needs to access or evaluate data from either dataset 414' or 420' may be performed by a single compute node. Further, database operations may be directed to dataset 414' (on node 402) and dataset 420' (on node 404) simultaneously, leveraging the architecture of parallel computing system 400. Further still, node 404 is free to perform other database operations, or store other portions of the in-memory database.

Figure 5A:
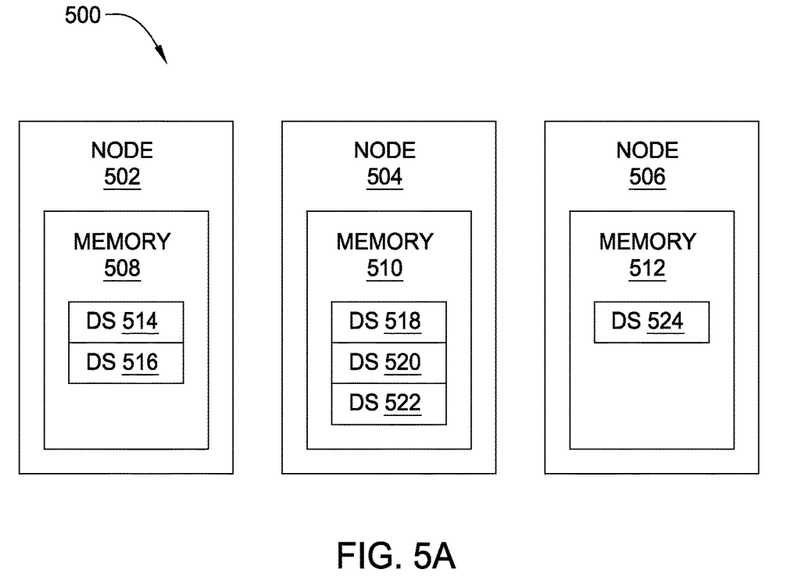
FIGS. 5A-5B are diagrams of an in-memory database distributed across multiple nodes of a parallel computing system, according to one embodiment of the invention.
Figure 5B:
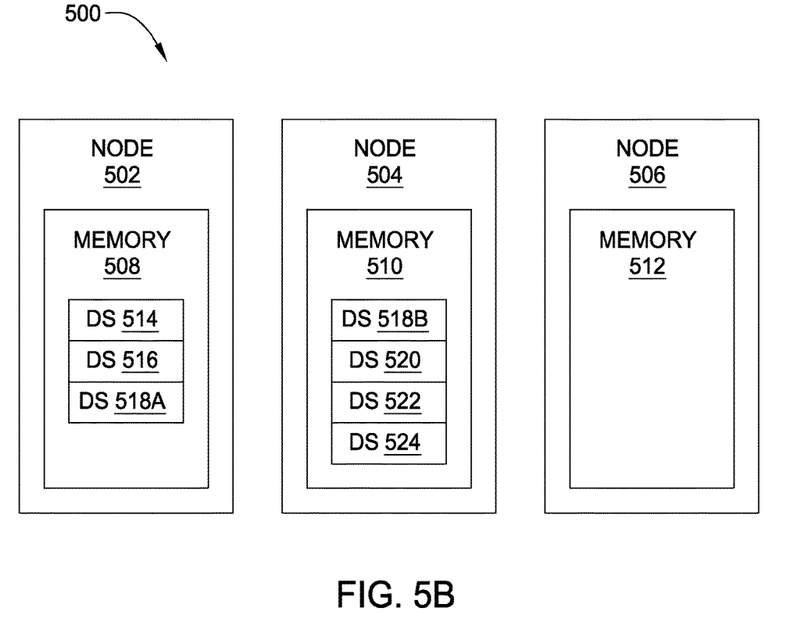

FIGS. 5A-5B illustrate another example of an in-memory database distributed across multiple nodes of a parallel computing system 500, according to one embodiment of the invention. As shown, FIG. 5A illustrates an in-memory database before portions of the database are compressed, and FIG. 5B illustrates the in-memory database after portions of the database have been compressed.

Illustratively, parallel computing system 500 includes compute nodes 502, 504, and 506, each containing at least one processor (not shown), and memories 508, 510, and 512. Collectively, the memories 508, 510, and 512 store an in-memory database that includes six datasets (DS) 514, 516, 518, 520, 522, and 524. Each dataset may represent a database file, table, or some other portion of a database or collection of data. As shown in FIG. 5A, node 502 stores datasets 514 and 516, node 504 stores datasets 518, 520, and 522, and node 506 stores dataset 524. Thus, in this example, none of the datasets are split across multiple compute nodes of parallel system 500.

In contrast, FIG. 5B shows an in-memory database after compression techniques have been used to compress some of the datasets included in this in in-memory database. Illustratively, dataset 518 (in FIG. 5A) has been distributed on nodes 502 and 504, as datasets 518A and 518B (in FIG. 5B). Assume for this example that data from datasets 518A and 518B are accessed by users only infrequently, thus, splitting this data into datasets 518A and 518B may not unacceptably degrade performance. Assume further that datasets 518A and 518B are highly compressed to minimize the size of both datasets 518A and 518B. After compressing dataset 518 (in FIG. 5A), FIG. 5B shows datasets 514, 516, 518A and 518B, 520, 522, and 524 stored using only nodes 502 and 504 of parallel computing system 500. Thus, node 506 is free for use by other jobs on parallel computing system 500.

Figure 6:
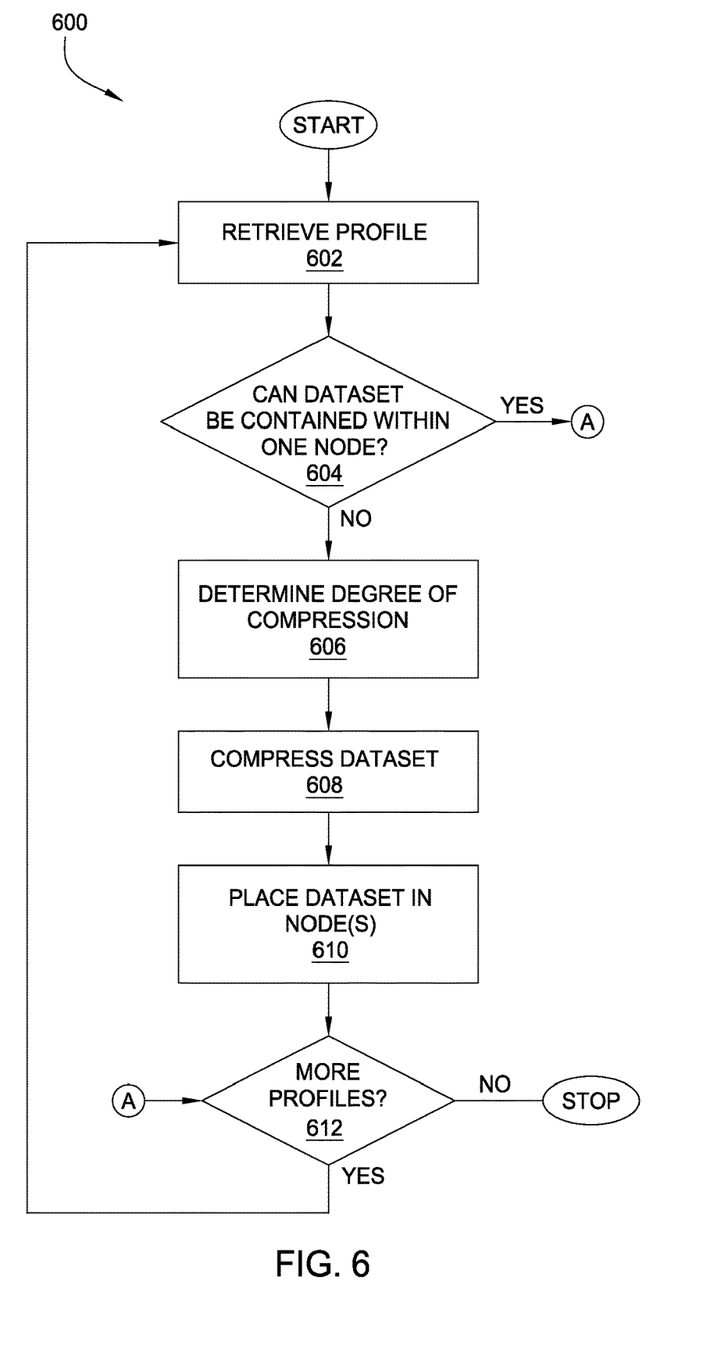
FIG. 6 is a flow diagram illustrating a method for distributing a database across multiple nodes of a parallel computing system, according to one embodiment of the invention.

FIG. 6 is a flow diagram illustrating method 600 for distributing an in-memory database across nodes of a parallel computing system, according to one embodiment of the invention. In one embodiment, an application running on a parallel computing system may collect data related to the performance of an in-memory database. For example, as described above, a DBMS monitoring application may be running on a control system 102 or front-end node 103 of a Blue Gene system. Of course, for other parallel architectures, other approaches may be used. In any case, the DBMS monitoring application may monitor how frequently database files or other elements of the in-memory database are accessed and evaluate different options for distributing and compressing portions of the in-memory database on the nodes of the parallel computing system. This information may be used to determine how aggressively to compress a given dataset so that it may be stored within the memory of a single compute node (or logically related group of nodes). That is, the DBMS monitoring application may be used to identify portions of a database that may be compressed to improve the performance of an in-memory database.

At step 602, the DBMS monitoring application may retrieve a profile related to a dataset in the database. As stated, each dataset may represent a database file, table, or some other portion of a database or collection of data to be stored in the compute nodes of a parallel computing system. The profile may indicate attributes of the dataset, how frequently data from the dataset is accessed by users of the database, past performance characteristics, relationship to other datasets, etc.

At step 604, the DBMS monitoring application may evaluate the profile to determine whether the dataset corresponding to that profile may be stored within a single compute node of the parallel system. More specifically, the DBMS monitoring application may determine whether the uncompressed dataset is larger than the available memory on a given compute node. If not, the next dataset profile may be retrieved and evaluated. However, in some cases, a dataset may still be compressed if doing so may increase the overall performance of an in-memory database. For example, compressing an infrequently accessed dataset may free memory resources for other, more frequently, accessed datasets.

Otherwise, if the dataset is larger than the memory available on a compute node, at step 606, the DBMS monitoring application may determine whether the dataset may be compressed to fit within a single compute node (or group of physically or logically related nodes). In one embodiment, the DBMS monitoring application may also determine whether, and how aggressively, to compress the dataset. For example, the dataset profile may indicate how frequently data from the dataset is accessed. In such case, datasets with higher access frequencies may be less aggressively compressed than datasets with lower access frequencies. In another case, the DBMS monitoring application may be configured to evaluate the number of nodes required to store the dataset for different levels of compression. By balancing the overhead created by different levels of compression against the overhead of greater data communication requirements for larger sets of compute nodes, performance of the in-memory database may be improved. In one embodiment, a compression level may be selected such that the compressed dataset may be stored within a logical or physical boundary of a parallel computing system. For example, the dataset may be compressed to fit within a (Pset), or a midplane of a Blue Gene® system. Of course, for other parallel architectures, other logical or physical boundaries may be used to determine a compression level to use for a given dataset.

Another consideration that may be a used to determine a compression level is the size of a given dataset relative to the remaining memory space on a compute node. Generally, memory space utilization may be optimized by compressing as many datasets on a compute node as possible. Typically, accessing data on a single node requires less processing time than accessing data across multiple compute nodes. However, decompression increases access time. Accordingly, if data access across nodes for a dataset with a lower compression level is less than data access on one node with higher compression, the DBMS monitoring application may determine to use the former.

At step 608, the dataset is compressed using the compression level determined in step 606. At step 610, the dataset may be stored on the appropriate compute node or nodes. Alternatively, if the database already resides on the nodes of a parallel computing system, then the DBMS monitoring application may instruct compute nodes to compress, decompress, or move the dataset, as appropriate. At step 612, if more dataset profiles remain to be processed, method 600 repeats, starting from step 602.

Advantageously, after method 600 is performed, an in-memory database may occupy fewer compute nodes of a parallel system, while also providing improved performance characteristics. Access a given datasets may be more efficient because data from the database is stored within single nodes (or a set of physically or logically related group of nodes). Although some overhead may be incurred to decompress a dataset, this overhead may be offset by the reduced requirements for node-to-node communications.

While the foregoing is directed to embodiments of the present invention, other and further embodiments of the invention may be devised without departing from the basic scope thereof, and the scope thereof is determined by the claims that follow.

What is claimed is:

1. A computer-implemented method for distributing a database having a plurality of datasets on a plurality of compute nodes on a parallel computing system, comprising:
   selecting a first dataset from the plurality of datasets, wherein each dataset includes records from at least a portion of a database table;
   evaluating a profile associated with the first dataset to determine a data compression level to use in compressing the first dataset;
   compressing the first dataset using the determined data compression level;
   storing the compressed dataset on at least a first one of the plurality of compute nodes, wherein each computing node includes at least a processor and a memory storing a query application, and wherein the compression level is determined to allow at least first one of the datasets to be stored in the memory of the first one or more compute nodes;

distributing the remaining datasets from the plurality of datasets forming the database to remaining nodes of the plurality of compute nodes of the parallel computing system, wherein each compute node receiving a dataset stores the received data set in the memory of that compute node; and executing the query application on each of the plurality of compute nodes, including the query application on the first one or more compute nodes, to retrieve any records from the plurality of datasets responsive to a database query.

2. The method of claim 1, wherein the first dataset is compressed to fit within a single node of the plurality of compute nodes of the parallel system.

3. The method of claim 1, wherein the set of compute nodes share access to a communication resource of the parallel computing system.

4. The method of claim 1, wherein the set of compute nodes are physically connected by node-to-node communications links.

5. The method of claim 1, further comprising:
monitoring access to data stored in the plurality of datasets of the in-memory database; and
updating the profile associated with the first dataset based on the monitoring.

6. The method of claim 1, wherein the profile specifies how frequently data from the first dataset is accessed by users of the in-memory database.

7. The method of claim 1, wherein the level of data compression specifies how much to reduce a byte-size of the first dataset using a selected compression algorithm.

8. A computer readable storage medium containing a program which, when executed, performs an operation for distributing a database having a plurality of datasets on a plurality of compute nodes on a parallel computing system, the operation comprising:

selecting a first dataset from the plurality of datasets, wherein each dataset includes records from at least a portion of a database table;

evaluating a profile associated with the first dataset to determine a data compression level to use in compressing the first dataset;

compressing the first dataset using the determined data compression level;

storing the compressed dataset on at least a first one of the plurality of compute nodes, wherein each computing node includes at least a processor and a memory storing a query application, and wherein the compression level is determined to allow at least first one of the datasets to be stored in the memory of the first one or more compute nodes; and distributing the remaining datasets from the plurality of datasets forming the database to remaining nodes of the plurality of compute nodes of the parallel computing system, wherein each compute node receiving a dataset stores the received data set in the memory of that compute node; and executing the query application on each of the plurality of compute nodes, including the query application on the first one or more compute nodes, to retrieve any records from the plurality of datasets responsive to a database query.

9. The computer readable storage medium of claim 8, wherein the first dataset is compressed to fit with in a single node of the plurality of compute nodes of the parallel system.

10. The computer readable storage medium of claim 8, wherein the first dataset is compressed to fit within a set of compute nodes, of the plurality of compute nodes, within a logical or a physical boundary of the plurality of compute nodes of the parallel computing system.

11. The computer readable storage medium of claim 10, wherein the set of compute nodes share access to a communication resource of the parallel computing system.

12. The computer readable storage medium of claim 10, wherein the set of compute nodes are physically connected by node-to-node communications links.

13. The computer readable storage medium of claim 8, wherein the operations further comprise:
monitoring access to data stored in the plurality of datasets of the in-memory database; and
updating the profile associated with the first dataset based on the monitoring.

14. The computer readable storage medium of claim 8, wherein the profile specifies how frequently data from the first dataset is accessed by users of the in-memory database.

15. The computer readable storage medium of claim 8, wherein the first dataset comprises one of a database file and a database table storing a portion of data of the database.

16. The computer readable storage medium of claim 8, wherein the level of data compression specifies how much to reduce a byte-size of the first dataset using a selected compression algorithm.

17. A parallel computing system, comprising:
a plurality of compute nodes, each having at least a processor and a memory; and
a control node configured to perform an operation for distributing a database having a plurality of datasets on the plurality of compute nodes of the parallel computing system by performing the steps of:

selecting a first dataset from the plurality of datasets, wherein each dataset includes records from at least a portion of a database table, evaluating a profile associated with the first dataset to determine a data compression level to use in compressing the first dataset;

compressing the first dataset using the determined data compression level, storing the compressed dataset on at least a first one of the plurality of compute nodes, wherein each computing node includes at least a processor and a memory storing a query application, and wherein the compression level is determined to allow at least first one of the datasets to be stored in the memory of the first one or more compute nodes, distributing the remaining datasets from the plurality of datasets forming the database to remaining nodes of the plurality of compute nodes of the parallel computing system, wherein each compute node receiving a dataset stores the received data set in the memory of that compute node;

executing the query application on each of the plurality of compute nodes, including the query application on the first one or more compute nodes, to retrieve any records from the plurality of datasets responsive to a database query.

18. The system of claim 17, wherein the first dataset is compressed to fit within a single node of the plurality of compute nodes of the parallel system.

19. The system of claim 17, wherein the first dataset is compressed to fit within a set of compute nodes, of the plurality of compute nodes, within a logical or a physical boundary of the plurality of compute nodes of the parallel computing system.

20. The system of claim 17, wherein the set of compute nodes share access to a communication resource of the parallel computing system.

21. The system of claim 17, wherein the steps further comprise:
    monitoring access to data stored in the plurality of datasets of the in-memory database; and
    updating the profile associated with the first dataset based on the monitoring.

22. The system of claim 17, wherein the profile specifies how frequently data from the first dataset is accessed by users of the in-memory database.

23. The system of claim 17, wherein the level of data compression specifies how much to reduce a byte-size of the first dataset using a selected compression algorithm.

* * * * *